(12) United States Patent
Ward

(10) Patent No.: US 11,933,686 B2
(45) Date of Patent: Mar. 19, 2024

(54) PRESSURE GAUGE RELIEF VALVE FOR STERILIZABLE FLUID SYSTEM

(71) Applicant: Repligen Corporation, Waltham, MA (US)

(72) Inventor: Travis R. Ward, Waltham, MA (US)

(73) Assignee: Repligen Corporation, Waltham, MA (US)

( * ) Notice: Subject to any disclaimer, the term of this patent is extended or adjusted under 35 U.S.C. 154(b) by 0 days.

(21) Appl. No.: 17/852,557

(22) Filed: Jun. 29, 2022

(65) Prior Publication Data

US 2023/0003600 A1    Jan. 5, 2023

Related U.S. Application Data

(60) Provisional application No. 63/217,947, filed on Jul. 2, 2021.

(51) Int. Cl.
*G01L 19/00* (2006.01)
*G01L 19/06* (2006.01)
(Continued)

(52) U.S. Cl.
CPC .......... *G01L 19/14* (2013.01); *G01L 19/0007* (2013.01); *G01L 19/0618* (2013.01); *F16K 17/04* (2013.01)

(58) Field of Classification Search
None
See application file for complete search history.

(56) References Cited

U.S. PATENT DOCUMENTS 4,672,996 A *  6/1987  Floyd ................ B01J 3/002
                                                137/859
5,554,113 A *  9/1996  Novak ............... A61M 1/3641
                                                604/30
(Continued)

FOREIGN PATENT DOCUMENTS

CN       103924993 A      7/2014
CN       110195791   *    9/2019
(Continued)

OTHER PUBLICATIONS

International Search Report and Written Opinion for the International Patent Application No. PCT/US2022/035430, dated Oct. 17, 2022, 53 pages.

*Primary Examiner* — Brandi N Hopkins
*Assistant Examiner* — Nigel H Plumb
(74) *Attorney, Agent, or Firm* — KDW Firm PLLC

(57) ABSTRACT

A pressure gauge and/or relief valve which may be used in a single-use fluid system, such as a sterilizable fluid system. The pressure gauge and/or pressure relief valve may be configured to measure and to relieve fluid within a fluid-containing structure, the pressure gauge relief valve including a housing having a first end, a second end, and an inner surface defining a passage between the first end and the second end, a movable element movable within the passage, wherein the housing first end is configured to be coupled with a fluid-containing structure, the housing second end is spaced from the housing first end; and the movable element is movable with respect to the housing to indicate pressure therein and to allow fluid to pass between the movable element and the inner surface of the passage at a selected pressure.

16 Claims, 3 Drawing Sheets

(51) Int. Cl.
*G01L 19/14* (2006.01)
*F16K 17/04* (2006.01)

(56) References Cited

U.S. PATENT DOCUMENTS

2013/0167952 A1* 7/2013 Mattson .............. F16K 37/0058
 137/551
2018/0339893 A1* 11/2018 Böhm ................. B05B 11/1004

FOREIGN PATENT DOCUMENTS

| CN | 110195791 A | 9/2019 |
| FR | 2991401 A1 | 12/2013 |
| KR | 20080068349 A | 7/2008 |
| WO | 0142693 A2 | 6/2001 |

* cited by examiner

PRESSURE GAUGE RELIEF VALVE FOR STERILIZABLE FLUID SYSTEM

CROSS REFERENCE TO RELATED APPLICATION

This is a non-provisional of pending provisional patent application Ser. No. 63/217,947, filed on Jul. 2, 2021, the entirety of which application is incorporated by reference herein.

FIELD

The present disclosure relates generally to the field of fluid devices and systems. More particularly, the present disclosure relates to monitoring and relieving pressure in fluid devices and systems. Even more particularly, the present disclosure relates to single-use devices and systems such as tube sets and fluid bags, and monitoring and relieving pressure therein.

BACKGROUND

Tube sets for fluid flow and fluid bags are well known for use in various systems in various industries. More particularly, tube sets may be used to fluidly connect various components of systems with fermenters, bioreactors, chromatography filters, pumps, etc. For instance, tube sets may be used between two or more fermenters and/or bioreactors; between a fermenter and/or bioreactor and an associated filter; between filters; from a filter to an exhaust port; to transport fluids to a collection container (e.g., bag, vessel, etc.); to direct fluid to or from a pump; etc. The tube sets often include a generally flexible tube, and at least one connector, such as a hose barb, a T connector, a Y connector, etc. The tubes used in environments or systems requiring a high degree of sterility may be made of a material capable of being sterilized (e.g., gamma irradiated), such as a metal (e.g., stainless steel) a polymer, thermoplastic elastomer, or thermoplastic (e.g., silicone). Moreover, tube sets used in environments or systems requiring a high degree of sterility often are made for single use applications. As such, the tubes may not be designed to withstand high degrees of pressure. However, fluid flow through tubes of a tube set may be controlled at various points to control or direct fluid as needed or desired. For instance, tubes are regularly clamped or pinched (e.g., with a pinch clamp squeezing the exterior of the tube). If one or more components of a system are coupled with a tube set which has been clamped or pinched, and one or more of the components are run without consideration of the state of fluid flow through the tube set, the maximum pressure through the tube may be exceeded and the tube may burst. Not only may sterility be lost, but caustic or toxic fluids may also be sprayed from the system with various deleterious consequences. Equipment may be damaged as well. For instance, if a pump is run at too high a rate and a tube coupled to the pump has been pinched or clamped, not only may the tube burst, but the pump may also be damaged. Even if there is no interference with fluid flow through the tube set or system in which the tube set is provided (in other words, even if tubes remain open for regular fluid flow therethrough), spikes in pressure may occur and may compromise the integrity or functioning of components of the tube set/system.

In view of the above, monitoring and relieving pressure, such as in a single-use system, is critical, such as for operator safety, maintaining desired yield, maintaining quality, preventing damage to system components, preventing system failure, maintaining integrity and continuity of system components and processes, etc. Although various sensors exist for monitoring pressure, such sensors must be monitored. And existing pressure gauges and indicators and relief valves are formed of stainless steel and not readily integrated into tube sets such as those used in sterile environments and/or for single use. The cost of existing pressure gauges and indicators and relief valves may be prohibitive, particularly in a single-use, disposable system. Various industries utilizing tube sets remain in need of pressure gauges and/or pressure relief valves (optionally with visual indicators and/or sensors) which are usable, in particular, in single use, disposable systems, such as in sterile environments. In addition or alternatively, it would be desirable for a pressure gauge to be designed for a sterile environment without a hold-up volume or dead leg in which fluid may build up and/or bacteria may proliferate.

SUMMARY

This summary of the disclosure is given to aid understanding, and one of skill in the art will understand that each of the various aspects and features of the disclosure may advantageously be used separately in some instances, or in combination with other aspects and features of the disclosure in other instances. No limitation as to the scope of the claimed subject matter is intended by either the inclusion or non-inclusion of elements, components, or the like in this summary.

In accordance with various principles of the present disclosure, a pressure gauge with integrated relief valve is configured to measure and to relieve fluid within a fluid-containing structure.

In one aspect, the pressure gauge with integrated relief valve includes a housing having a first end and a second end and having an inner surface defining a passage between the first end and the second end. In some embodiments, the housing also includes a movable element movable within the passage. The housing first end is configured to be coupled with a fluid-containing structure, the housing second end is spaced from the first end, and the movable element is movable with respect to the housing to indicate pressure therein and to allow fluid to pass between the movable element and the inner surface of the passage at a selected pressure.

In some embodiments, the integrated pressure gauge relief valve further includes graduated markings on the housing, the movable element movable with respect to the graduated markings to indicate pressure within the housing. In some embodiments, the housing is formed of transparent or translucent material so that the movable element is viewable therein adjacent the graduated markings.

Additionally or alternatively, the passage within the housing is tapered outwardly from the first end of the housing to the second end of the housing. In some embodiments, the movable element seals against the inner surface of the housing when the movable element is positioned adjacent the first end of the housing, the housing defines a fluid exit adjacent the second end of the housing, and the movable element has a periphery spaced from the inner surface of the housing when the movable element is positioned adjacent the fluid exit to allow fluid to exit the housing through the fluid exit. In some embodiments, the integrated pressure gauge relief valve further includes a biasing element configured and positioned to bias the movable element toward the first end of the housing.

In some embodiments, the housing is formed of a sterilizable polymeric material.

In some embodiments, the housing is formed of a material weldable with a sterilizable fluid-containing structure. In some embodiments, the housing is formed of a sterilizable polymeric material weldable with a sterilizable fluid-containing structure.

In some embodiments, the movable element has a first side facing toward the fluid-containing structure and substantially aligned with an inner surface of a wall of the fluid-containing structure to which the integrated pressure gauge relief valve is coupled.

In some embodiments, the integrated pressure gauge relief valve further includes a sensor coupled to the housing.

In accordance with various aspects of the present disclosure, a single-use pressure gauge and/or relief valve is formed of a sterilizable material. In some embodiments, the sterilizable single-use pressure gauge and/or relief valve includes a housing comprised of a sterilizable polymeric material, and having a first end and a second end and an inner surface defining a passage between the first end and the second end. The sterilizable single-use pressure gauge and/or relief valve may further include a movable element movable within the passage in response to a change in pressure within the housing.

In some embodiments, the pressure gauge and/or relief valve further includes graduated markings on the housing, the movable element movable with respect to the graduated markings to indicate pressure within the housing indicative of pressure within a fluid-containing structure to which the housing is coupled. In some embodiments, the housing is formed of transparent or translucent material so that the movable element is viewable therein adjacent the graduated markings. In some embodiments, the passage within the housing is tapered outwardly from the first end of the housing to the second end of the housing so that the movable element prevents fluid from flowing between the outer periphery of the movable element and the inner surface of the housing when the movable element is adjacent the housing first end, and allows fluid to flow between the outer periphery of the movable element and the inner surface of the housing when the movable element is adjacent the second end of the housing to relieve pressure from within the fluid-containing structure to which the pressure gauge and/or relief valve is coupled.

In some embodiments, the passage within the housing is tapered outwardly from the first end of the housing to the second end of the housing so that the movable element prevents fluid from flowing between the outer periphery of the movable element and the inner surface of the housing when the movable element is adjacent the first end of the housing, and allows fluid to flow between the outer periphery of the movable element and the inner surface of the housing when the movable element is adjacent the second end of the housing to relieve pressure from within the fluid-containing structure to which the pressure gauge and/or relief valve is coupled.

In some embodiments, the sterilizable polymeric material is weldable to sterilizable material forming a fluid-containing structure to which the pressure gauge and/or relief valve is coupled.

In accordance with various aspects of the present disclosure, a method of retrofitting a fluid-containing structure with a pressure gauge and/or relief valve includes modifying a disposable fluid-containing structure to be coupled with a pressure gauge and/or relief valve, and coupling a disposable, non-metallic pressure gauge and/or relief valve with the disposable fluid-containing structure.

In some embodiments, the method where the fluid-containing structure and the pressure gauge and/or relief valve are comprised of compatible materials which are weldable together.

In some embodiments, the method further includes splicing polymeric tubing of a disposable tube set with the pressure gauge and/or relief valve.

These and other features and advantages of the present disclosure, will be readily apparent from the following detailed description, the scope of the claimed invention being set out in the appended claims. While the following disclosure is presented in terms of aspects or embodiments, it should be appreciated that individual aspects can be claimed separately or in combination with aspects and features of that embodiment or any other embodiment.

BRIEF DESCRIPTION OF THE DRAWINGS

Non-limiting embodiments of the present disclosure are described by way of example with reference to the accompanying drawings, which are schematic and not intended to be drawn to scale. The accompanying drawings are provided for purposes of illustration only, and the dimensions, positions, order, and relative sizes reflected in the figures in the drawings may vary. For example, devices may be enlarged so that detail is discernable. In the figures, identical or nearly identical or equivalent elements are typically represented by the same reference characters, and similar elements are typically designated with similar reference numbers differing in increments of 100, with redundant description omitted. For purposes of clarity and simplicity, not every element is labeled in every figure, nor is every element of each embodiment shown where illustration is not necessary to allow those of ordinary skill in the art to understand the disclosure.

The detailed description will be better understood in conjunction with the accompanying drawings, wherein like reference characters represent like elements, as follows.

DETAILED DESCRIPTION

Figure 1:
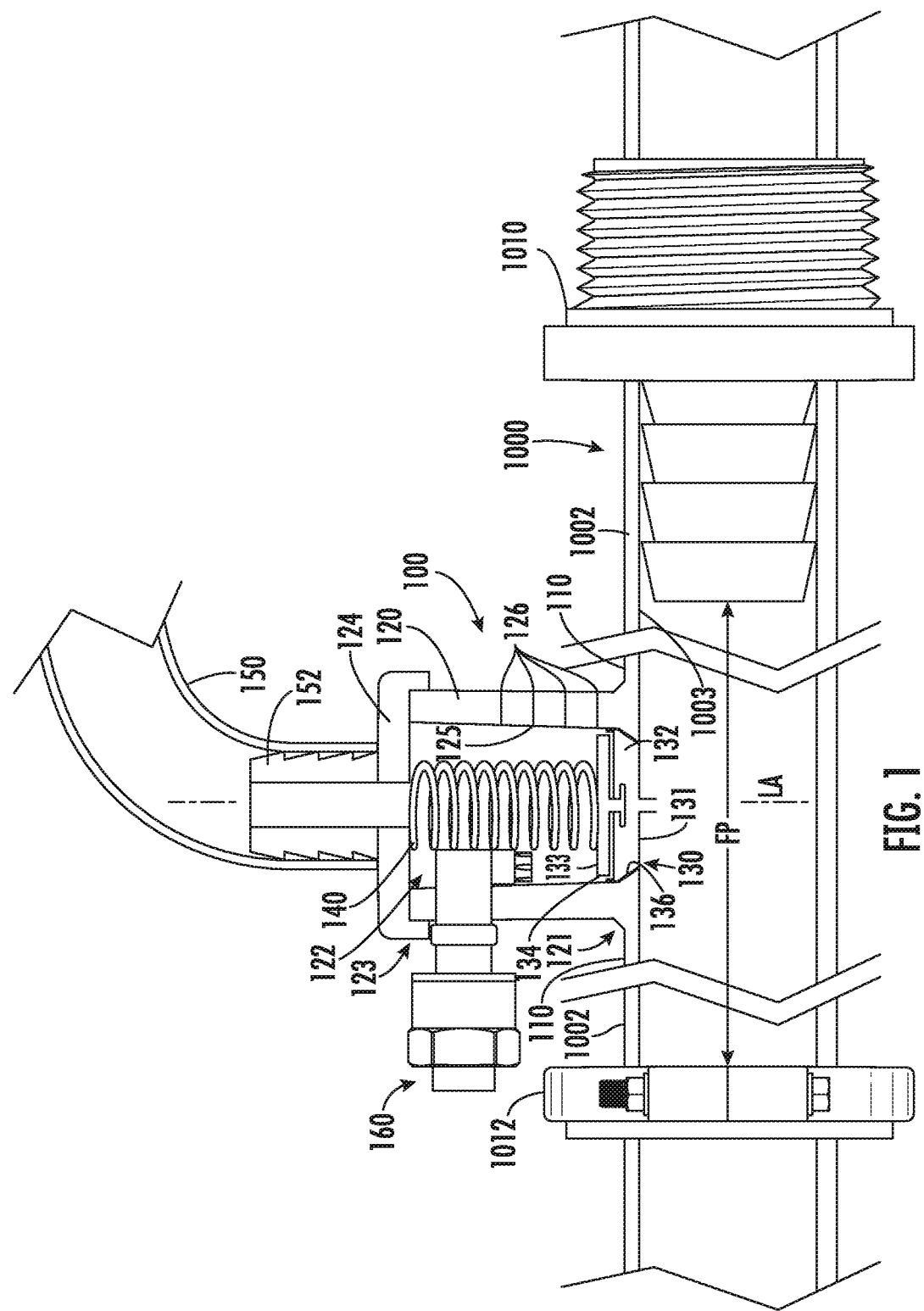
FIG. 1 illustrates an elevational view, in cross-section, of a pressure gauge/relief valve formed in accordance with various aspects of the present disclosure and in position in a tube through which fluid flows.

The following detailed description should be read with reference to the drawings, which depict illustrative embodiments of a pressure gauge and/or pressure relief valve formed in accordance with various principles of the present disclosure. It will be appreciated that various features, forms, structures, etc. of a pressure gauge are described herein. Various features, forms, structures, etc. of a relief valve are also described herein, and may be used separately from a pressure gauge as a stand-alone relief valve, or in combination with a pressure gauge as a combined pressure gauge relief valve. For the sake of convenience, and without intent to limit, reference is made herein to a pressure gauge and/or pressure relief valve to reference a pressure gauge, or a relief valve, or a combined pressure gauge and relief valve.

It is to be understood that the disclosure is not limited to the particular embodiments described, as such may vary. All apparatuses and systems and methods discussed herein are examples of apparatuses and/or systems and/or methods implemented in accordance with one or more principles of this disclosure. Each example of an embodiment is provided by way of explanation and is not the only way to implement these principles but are merely examples. Thus, references to elements or structures or features in the drawings must be appreciated as references to examples of embodiments of the disclosure, and should not be understood as limiting the disclosure to the specific elements, structures, or features illustrated. Other examples of manners of implementing the disclosed principles will occur to a person of ordinary skill in the art upon reading this disclosure. In fact, it will be apparent to those skilled in the art that various modifications and variations can be made in the present disclosure without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the appended claims and their equivalents.

It will be appreciated that the present disclosure is set forth in various levels of detail in this application. In certain instances, details that are not necessary for one of ordinary skill in the art to understand the disclosure, or that render other details difficult to perceive may have been omitted. The terminology used herein is for the purpose of describing particular embodiments only, and is not intended to be limiting beyond the scope of the appended claims. Unless defined otherwise, technical terms used herein are to be understood as commonly understood by one of ordinary skill in the art to which the disclosure belongs. All of the devices and/or methods disclosed and claimed herein can be made and executed without undue experimentation in light of the present disclosure.

Various embodiments of pressure gauges and/or pressure relief valves are described herein with reference to examples illustrated in the accompanying drawings which show one or more unique separate and independent features thereof. Various separate and independent features of a pressure gauge and/or pressure relief valve are described herein which may be combinable or which may be provided separately from one another. Reference in this specification to "one embodiment," "an embodiment," "some embodiments", "other embodiments", etc. indicates that one or more particular features, structures, and/or characteristics in accordance with principles of the present disclosure may be included in connection with the embodiment. However, such references do not necessarily mean that all embodiments include the particular features, structures, and/or characteristics, or that an embodiment includes all features, structures, and/or characteristics. Some embodiments may include one or more such features, structures, and/or characteristics, in various combinations thereof. Moreover, references to "one embodiment," "an embodiment," "some embodiments", "other embodiments", etc. in various places in the specification are not necessarily all referring to the same embodiment, nor are separate or alternative embodiments necessarily mutually exclusive of other embodiments. When particular features, structures, and/or characteristics are described in connection with one embodiment, it should be understood that such features, structures, and/or characteristics may also be used in connection with other embodiments whether or not explicitly described, unless clearly stated to the contrary. It should further be understood that such features, structures, and/or characteristics may be used or present singly or in various combinations with one another to create alternative embodiments which are considered part of the present disclosure, as it would be too cumbersome to describe all of the numerous possible combinations and subcombinations of features, structures, and/or characteristics. Moreover, various features, structures, and/or characteristics are described which may be exhibited by some embodiments and not by others. Similarly, various features, structures, and/or characteristics or requirements are described which may be features, structures, and/or characteristics or requirements for some embodiments but may not be features, structures, and/or characteristics or requirements for other embodiments. Therefore, the present invention is not limited to only the embodiments specifically described herein.

In accordance with one aspect of the present disclosure, a pressure gauge and/or a pressure relief valve is configured for use with a single-use, disposable component through which or into which fluid flows, such as a tube set, or a bag (e.g., a fluid collection bag, a fluid containment bag, a fluid mixing bag, a bioreactor, etc.). It will be appreciated that references herein to fluid are intended to include references to gases and/or liquids. For the sake of convenience, and without intent to limit, reference may be made simply to a tube set, with the understanding that other components, such as bags or otherwise, may be encompassed by such reference (e.g., as an alternative, or in addition). Moreover, for the sake of convenience, and without intent to limit, a structure through which fluid flows or is contained may be generically referenced herein as a fluid-containing structure. For use with some systems requiring sterility, the tube set may be formed of a sterilizable material. For use with such sterile systems, the pressure gauge and/or pressure relief valve also is formed of a sterilizable material. As referenced herein, a sterilizable material generally is readily sterilized by such common processes as autoclaving, exposure to gamma radiation, steaming, or exposure to other sterilizing gases such as ethylene oxide. Moreover, for use with single-use, disposable tube sets, the pressure gauge and/or pressure relief valve may be formed of a material commonly used for single-use and to be discarded rather than reused and recycled. As those of ordinary skill in the art would appreciate, such materials generally are not metals, and may be plastics/polymers (such as polypropylene (PP), polyethylene (PE), polycarbonate (PC), polysulfone (PSU), polyvinylidene fluoride (PVDF), etc.), or silicone, or a thermoplastic elastomer (TPE) or other materials which are generally less expensive and/or more easily formable into the desired components. In some embodiments, the material of at least a part of a pressure gauge and/or pressure relief valve formed in accordance with various principles of the present disclosure is compatible with the material of the fluid-containing structure to which the pressure gauge and/or pressure relief valve is to be coupled. Such compatible materials may be selected to be capable of being plastic or TPE welded. molded (e.g., over-molded or insert molded), or otherwise coupled together so that the pressure gauge and/or pressure relief valve may be retrofitted (e.g., modified from its as-manufactured form or configuration) onto and/or with existing fluid-containing structures, which generally do not include a pressure gauge or a pressure relief valve. For instance, a tube of a tube set may be cut and spliced together with a pressure gauge and/or pressure relief valve inserted between the cut ends of the tube.

In some embodiments, a pressure gauge and/or pressure relief valve is formed in accordance with various principles of the present disclosure with one or more fittings configured to be coupled with a fluid-containing structure. In some embodiments, the fitting may be a straight-through fitting configured for fluid to flow therethrough, such as in-line or otherwise generally along the fluid flow path of the fluid-containing structure. Such configuration may be suitable for insertion along tubing of a tube set. The pressure gauge and/or relief valve may extend transverse to the fitting. In some embodiments, the fitting may be a port-type fitting along a wall of a fluid-containing structure, such as extending through the wall (e.g., having a longitudinal axis generally transverse to a plane in which the wall extends). The fitting can be coupled to a fluid-containing structure through any of the following mechanisms, or other known or heretofore known mechanisms, without limitation: any of a variety of mechanical/structural connectors (e.g., hose barb; sanitary clamp; Luer connection; etc.); welding (e.g., welding of a TPE fitting to tubing such as TPE tubing; plastic welding to the wall of the fluid-containing structure such as impulse, ultrasonic, etc., welding); molding (e.g., silicone-over-molded/insert-molded into a fluid path; polymeric-over-molded/insert-molded onto a product device; etc.); etc.

In accordance with various principles of the present disclosure, a pressure gauge and/or pressure relief valve may be formed to minimize or reduce or even completely eliminate any dead leg or hold-up volume which typically is present in pressure gauges and/or pressure relief valves. In some embodiments, the indicator element of a pressure gauge formed in accordance with principles of the present disclosure, or the movable valve of a relief valve formed in accordance with principles of the present disclosure, is positioned in-line with or substantially in-line with the inner walls of the tube set with which the pressure gauge or relief valve is coupled. The inner walls of the tube set generally may be considered to define or form the fluid passage with which the pressure gauge and/or pressure relief valve is associated. As such, fluid flowing through the tube set is not significantly diverted into the pressure gauge and/or relief valve (such as in a passage of or a passage leading to the pressure gauge and/or relief valve), and does not pool or remain stationary therein. In some embodiments, the movable element of the pressure gauge and/or pressure relief valve has a rest position (when fluid is flowing at the desired flow rate and/or pressure through the fluid passage) at the bottom of the passage from the fluid passage into the functional passage of the pressure gauge and/or pressure relief valve (the passage in the pressure gauge at which the movable element would indicate the pressure of fluid flowing through the tube set, or the passage through which fluid is diverted to be released via the relief valve).

A pressure gauge and/or pressure relief valve may be formed in accordance with various principles of the present disclosure in a simple configuration with minimal (e.g., one or two) moving parts. For instance, a pressure gauge formed in accordance with various principles of the present disclosure may simply include a movable element (e.g., a follower) within a passage of a housing of the pressure gauge. The movable element may be a ball or disk which floats up and down the passage such as when pressure increases in the fluid-containing structure and fluid in such structure is diverted into the pressure gauge. The movable element may move with respect to graduated markings on the housing and thus may serve as an indicator of pressure within the housing of the pressure gauge and/or within the system with which the pressure gauge is coupled. The housing may be transparent or translucent, or may have a transparent or translucent window therein, to allow viewing of the movable element relative to the graduated markings to determine pressure within the housing and/or the system with which the pressure gauge is provided. A biasing element, such as a spring (more particularly, such as a tuned spring), may be provided to maintain the movable element in a neutral/zero pressure/baseline position under normal operating conditions in which the system functions without incident. If pressure increases (e.g., within the system to which the pressure gauge is coupled) above an acceptable level, the movable element may be moved by such pressure against the biasing element. The pressure gauge can be set for different ranges of pressure.

Likewise, a relief valve formed in accordance with various principles of the present disclosure may simply include a movable element (e.g., a follower) within a passage of a housing of the relief valve. The movable element may be similar to the movable element described above with respect to a pressure gauge formed in accordance with various principles of the present disclosure. The housing passage may taper outwardly from an end of the passage closer to the fluid-containing structure to an end further away from the fluid-containing structure (such as a result of drafting of the housing during manufacture). As the movable element is moved further away from the fluid-containing structure (e.g., as a result of rising pressure), at a certain distance, fluid can flow past the movable element and out of the housing of the relief valve. In some embodiments, the movable element is a flexible element. A flexible movable element may seal against the inner walls of the relief valve housing when positioned adjacent the fluid-containing structure. As the flexible movable element moves up a tapered passage, the distance between the periphery of the flexible movable element and the inner surface of the passage increases until fluid can pass therebetween, such as to exit the relief valve. In some embodiments, the flexible movable element is reduced in size (e.g., folded or bent or otherwise configured to extend across a smaller space than the full size defined by the periphery of the movable element) such as when positioned adjacent the fluid-containing structure. The flexible movable element increases in size or extent (e.g., width or size defined by the periphery thereof relative to the inner dimensions of the passage) as it moves away from the fluid-containing structure. At a certain distance, the outer dimensions of the movable element are smaller than the inner dimensions of the passage, and fluid can pass therebetween. Fluid passing the movable element may exit the relief valve (e.g., leave the fluid-containing structure and/or devices coupled thereto), such as through an end of the housing spaced from the fluid-containing structure. Release of fluid (by exiting the relief valve) may prevent catastrophic failure to the fluid-containing structure and any devices coupled thereto, injury to the operator, loss of product, etc. A fitting may be coupled to the relief valve, and may be in fluid communication with an external fluid path through which fluid may be directed, such as to a bag, drain, or collection vessel/container. The relief valve may be chosen to trigger at the maximum working range of all acceptable pressures for the fluid-containing structure and/or systems or devices coupled thereto.

In some embodiments, pressure gauge features and components, and relief valve features and components may be combined into a single device. For instance, in some embodiments, the housing of the pressure gauge may also serve as the outlet for the relief valve. Even more particularly, in some embodiments, a movable indicator used to indicate pressure in a pressure gauge may also serve a dual purpose as a movable valve of a pressure relief valve. The housing may be tapered or have a drafted passage for a movable pressure gauge indicator/moveable relief valve element. In some embodiments, a common housing of a pressure gauge and relief valve may be provided with indicia for measuring pressure, and an end of the housing spaced from the tube set may be formed as a pressure relief outlet. The housing may be formed of a transparent or translucent material to allow a movable indicator or valve to be visible therethrough. The position of the movable indicator relative to markings on the housing may be used to indicate the measured pressure of fluid flowing through the tube set (and, optionally, pressure through at least that part of the system in which the tube set is provided). Different biasing elements may be used for each device to enable different pressure gauge and relief ranges and setpoints, respectively.

In accordance with various principles of the present disclosure, a sensor may be coupled to a pressure gauge and/or pressure relief valve to transmit information such as pressure information to another component in fluid communication with the tube set with which the pressure gauge and/or pressure relief valve is coupled. In some embodiments, the sensor may be coupled to a component of the pressure gauge and/or pressure relief valve. In some embodiments, the sensor may be coupled to a spring of the pressure gauge and/or pressure relief valve (such as a spring associated with a movable indicator or valve element). In some embodiments, the sensor may otherwise track a movable indicator or valve element of the pressure gauge and/or pressure relief valve, such as with a visual sensor tracking movement of a movable indicator or valve element.

It will be appreciated that in the following description, elements, or components similar among the various illustrated embodiments with reference numbers under 1000 are generally designated with the same reference numbers increased by 100 and redundant description is omitted. Common features are identified by common reference elements and, for the sake of brevity, the descriptions of the common features are generally not repeated. Certain features in one embodiment may be used across different embodiments and are not necessarily individually labeled when appearing in different embodiments. For purposes of clarity, not all components having the same reference number are numbered. Moreover, a group of similar elements may be indicated by a number and letter, and reference may be made generally to one or such elements or such elements as a group by the number alone (without including the letters associated with each similar element).

Turning now to the drawings, an example of an embodiment of a pressure gauge and/or pressure relief valve 100, 200 formed in accordance with various principles of the present disclosure is illustrated. More particularly, an example of an embodiment of a pressure gauge and/or pressure relief valve 100 is illustrated in cross-section in FIGS. 1 and 2. A pressure gauge and/or pressure relief valve 200 is illustrated in place in a tube set 1000 in FIG. 3. The pressure gauge and/or pressure relief valve 200 is illustrated in a perspective view in FIG. 3 in place in a bag 1010. It will be appreciated that the pressure gauge and/or pressure relief valve 100, 200 may share certain features or structures, and/or may have different or additional features or structures. The environment in which a pressure gauge and/or pressure relief valve 100, 200 formed in accordance with various principles of the present disclosure is provided (e.g., a tube set, bag, etc.) does not limit the features or structures of the pressure gauge and/or pressure relief valve 100, 200 unless specifically noted as doing so.

In accordance with one aspect of the present disclosure, a pressure gauge and/or pressure relief valve 100, 200 may be formed of a material generally considered for single-use and/or disposable components. Additionally or alternatively, the pressure gauge and/or pressure relief valve 100, 200 may be formed of a sterilizable material. Such pressure gauge and/or pressure relief valves 100, 200 are thus suitable for use with single-use and/or disposable and/or sterilizable structures or equipment through which fluid passes. Typical single-use and/or disposable and/or sterilizable materials (including, without limitation, polypropylene (PE), polyethylene (PE), polycarbonate (PC), polysulfone (PSU), polyvinylidene fluoride (PVDF), etc.), silicone, a thermoplastic elastomer (TPE), other copolymers and composite materials, and combinations thereof, may facilitate coupling of the pressure gauge and/or pressure relief valve 100, 200 with another structure. For instance, a single-use and/or disposable and/or sterilizable pressure gauge and/or pressure relief valve may be readily coupled with typical materials of the fluid-containing structure through which fluid to be gauged or relieved by the pressure gauge and/or pressure relief valve 100, 200 passes or is retained. Various manners of coupling include welding (e.g., heat or ultrasonic or other energy impulse), bonding (e.g., adhesive, chemical), molding (e.g., sinsert molding, injection molding, etc.), Luer locks, sanitary fittings, compression-type pipe fittings, etc.

Figure 2:
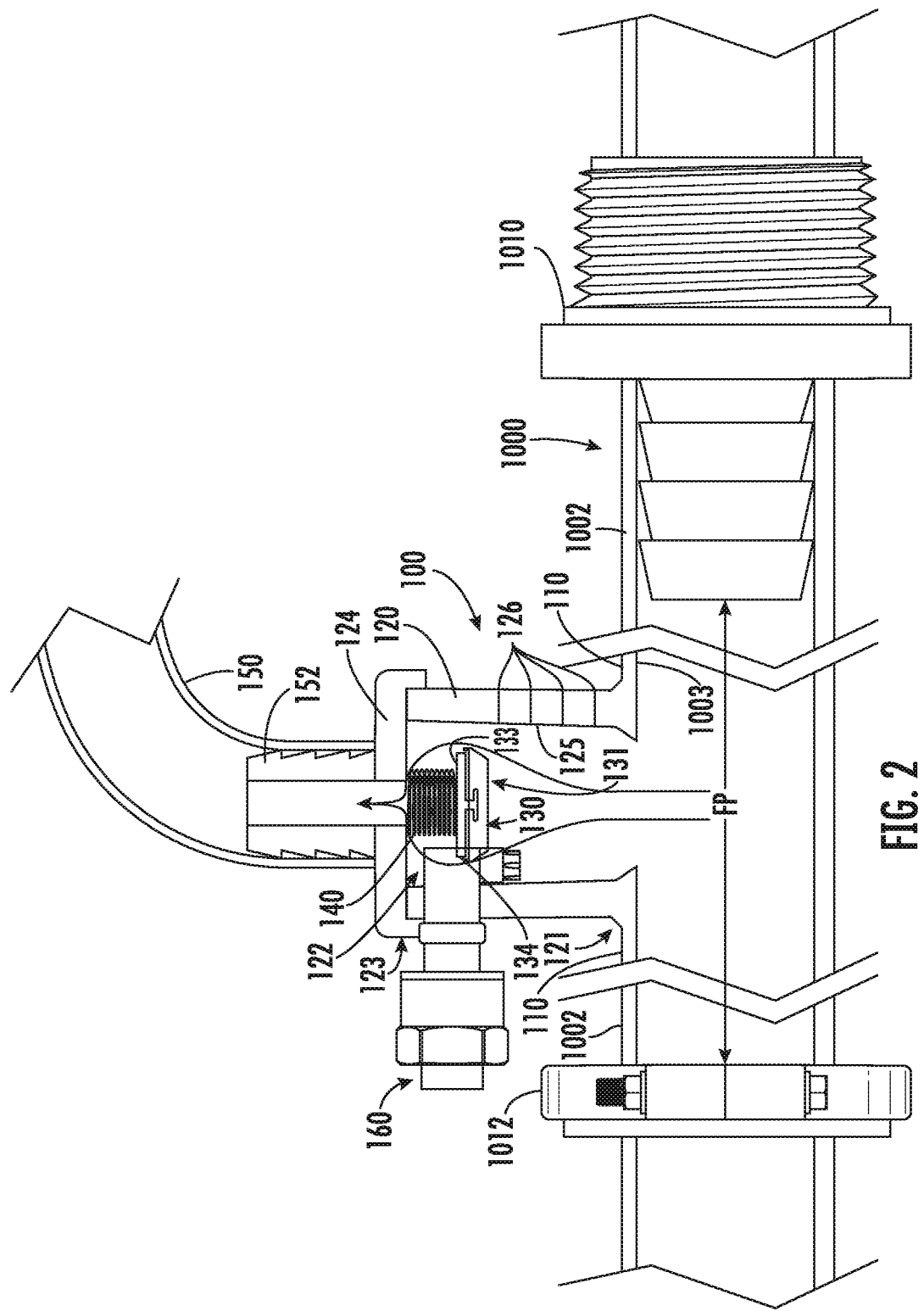
FIG. 2 illustrates an elevational view, in cross-section, of a pressure gauge/relief valve formed in accordance with various aspects of the present disclosure and in position in a tube through which fluid flows and with the relief valve relieving pressure from within the tube.

In the example of an embodiment illustrated in FIGS. 1 and 2, the pressure gauge and/or pressure relief valve 100 may be configured to be coupled to ends of a tube set 1000. For instance, the pressure gauge and/or pressure relief valve 100 may include one or more connector ends 110 sized, shaped, dimensioned, and configured, to be coupled with tubing 1002 of a tube set 1000. In some embodiments, the tubing 1002 of an existing tube set 1000 may be cut, a pressure gauge and/or pressure relief valve 100 formed in accordance with various principles of the present disclosure may be inserted between the cut ends of the tubing 1002 (such as by coupling the connector ends 110 of the pressure gauge and/or pressure relief valve 100 with the tubing 1002 of the tube set 1000), and the components spliced together. Any of a variety of processes may be used to splice together the pressure gauge and/or pressure relief valve 100 between ends of the tube set 1000, such as plastic welding, adhesive bonding, friction fitting, threaded connections, etc., such as to create a hermetic seal. Alternatively, the tube set 1000 may be formed with the pressure gauge and/or pressure relief valve 100 coupled thereto such as by a molding process (e.g., overmolding or insert molding the tubing of the tube set 1000 with the connector ends 1002 of the pressure gauge and/or pressure relief valve 100). Any of a variety of connectors known in the art, such as a hose barb connector 1010, and/or a tri-clamp connector 1012, such as illustrated in FIGS. 1 and 2, may be used to mechanically couple connector ends 110 of the pressure gauge and/or pressure relief valve 100 with tubing 1002.

Figure 3:
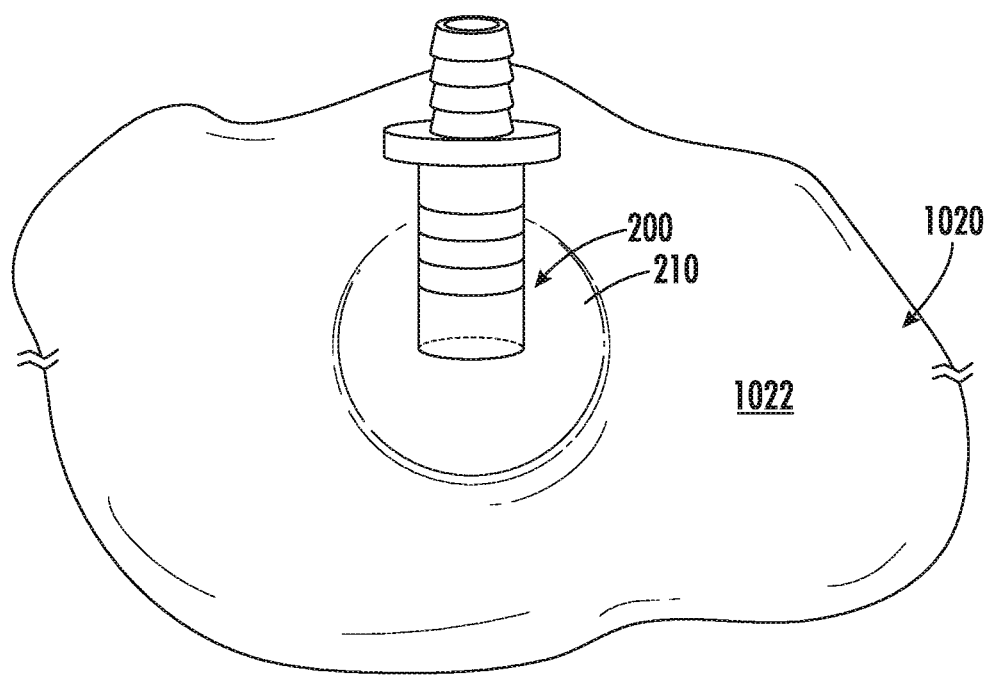
FIG. 3 illustrates a perspective view of a pressure gauge/relief valve formed in accordance with various principles of the present disclosure in position in a wall of a collection vessel.

In the example of an embodiment illustrated in FIG. 3, the pressure gauge and/or pressure relief valve 200 may be configured to be coupled with a bag 1020 (only a portion of which is illustrated). For instance, the pressure gauge and/or pressure relief valve 200 may include a connector flange 210 configured to be bonded to a wall of the bag 1020. A hole may be cut in the bag 1020, and the connector flange 210 may then be inserted through the hole and bonded to the wall 1022 of the bag 1020. Any of a variety of processes may be used to bond together the pressure gauge and/or pressure relief valve 200 with the bag wall 1022, such as plastic welding (e.g., heat or ultrasonic or other energy impulse), adhesive bonding, etc. In some embodiments, the bonding creates a hermetic seal. Other manners of providing a bag 1020 with a pressure gauge and/or pressure relief valve 200 formed in accordance with various principles of the present disclosure are within the scope of the present disclosure, such manners not being critical to principles of the present disclosure.

A pressure gauge and/or pressure relief valve 100, 200 formed in accordance with various principles of the present disclosure, includes a housing defining a passage in which a movable element is positioned. The housing passage is in fluid communication with the fluid-containing structure to which the housing is coupled or from which the housing otherwise extends. The movable element is a structure which is sized, shaped, configured, dimensioned, and positioned to move within the housing passage in response to pressure of fluid within the fluid-containing structure. In the case of a pressure gauge, as described with reference to an example of an embodiment in further detail below, the movable element may be structured as an indicator which moves relative to the housing to indicate the pressure of fluid within the fluid-containing structure. In the case of a relief valve, as described with reference to an example of an embodiment in further detail below, the movable element is a pressure valve which moves towards a pressure relief position in which fluid may be released if fluid pressure in the fluid-containing structure exceeds a pressure-relief value.

As illustrated in the cross-sectional view of FIG. 1, in accordance with various principles of the present disclosure, a pressure gauge and/or pressure relief valve 100 may have movable element 130 therein configured to reduce or prevent the formation of a hold-up of fluid therein (which is common in prior art pressure gauges and/or pressure relief valves). More specifically, in the example of an embodiment illustrated in FIG. 1, a pressure gauge and/or pressure relief valve 100 is coupled to tubing 1002 of a tube set 1000 through which fluid flows. A housing 120 of the pressure gauge and/or pressure relief valve 100 defines a passage 122 with a longitudinal axis LA extending transversely to the flow path FP through the tubing 1002. As may be appreciated with reference to FIG. 1, a movable element 130 within the passage 122 is sized, shaped, dimensioned, configured, and/or positioned under normal operating conditions (e.g., in a rest position) to inhibit or to block or to prevent passage of fluid from the tubing 1002 of the tube set 1000 into the passage 122 in the housing 120. As used herein, "normal operating conditions" are conditions in which the tube set 1000 operates without causing the tubing 1002 to expand or deform from a neutral configuration (such as a configuration in which no fluid or other substance is within or passing through the tubing 1002). In other words, normal operating conditions exist when the pressure gauge and/or pressure relief valve 100 does not register elevated pressure or require relief of excess pressure from within the tube set 1000. In the example of an embodiment illustrated in FIG. 1, the movable element 130 has a first side 131 facing toward the flow path FP and a second side 133 facing away from the flow path FP. Under normal operating conditions, in the example of an embodiment illustrated in FIG. 1, the first side 131 of the movable element 130 is substantially aligned with the inner surface 1003 of the tubing 1002. Fluid flowing along flow path FP thus cannot collect or stagnate (or at least minimally collects) or otherwise create a hold-up volume in a dead leg region toward the passage 122 within the pressure gauge and/or pressure relief valve 100.

In some embodiments, a biasing element 140 (e.g., a spring element, such as a coil spring) may exert a biasing force against the second side 133 of the movable element 130 to maintain the movable element 130 in a position substantially aligned with the inner surface 1003 of the tubing 1002 as illustrated in FIG. 1. A valve cover 124 may be provided over (optionally welded to) the second end 123 of the housing 120, such as to provide support for the biasing element 140. In some embodiments, the movable element 130 may be formed as a two-part element with a first section 132 along the first side 131 and a second section 134 along the second side 133. In some embodiments, the first section 132 is a flexible element and may seal against fluid flow past the movable element 130. For instance, the first section 132 may be a silicone plug. A seat 136 may be formed in the passage 122 adjacent the first end 121 of the housing 120 sized, shaped, dimensioned, configured, etc., for the first section 132 of the movable element 130 to fit against, such as to create a fluid seal. In some embodiments, the second section 134 is a relatively rigid element capable of withstanding forces from the biasing element 140 thereagainst without deforming.

As noted above, the movable element 130 may be structured as an indicator of a pressure gauge. In the example of an embodiment illustrated in FIGS. 1 and 2, the pressure gauge and/or pressure relief valve 100 may be a pressure gauge, and the movable element 130 may be an indicator. More particularly, the housing 120 may include graduated markings 126 along a portion thereof to indicate fluid pressure building up within the tube set 1000, as measured within the housing 120 of the pressure gauge 100. In some embodiments, the housing 120 is formed of a transparent or translucent material with graduated markings 126 formed thereon, or includes a window of a transparent or translucent material along which the graduated markings 126 are located (e.g., on the window or alongside the window). The movable element 130 may be a colored element (or otherwise visually distinct element) visible through the housing 120 adjacent the graduated markings 126. The position of the movable element 130 with respect to one of the graduated markings 126 indicates the fluid pressure within the tube set 1000/pressure gauge 100 as indicated by the graduated markings 126. If the movable element 130 is formed as a multi-part or multi-component element (e.g., a two-part element as in the example of an embodiment illustrated in FIGS. 1 and 2), then a visually distinct section of the movable element 130 should be sufficiently distinct to provide a clear pressure reading, as would be appreciated by one of ordinary skill in the art. For instance, if the movable element 130 has a flexible first section 132 and a more rigid second section 134, the more rigid second section 134 may be sized, shaped, configured, and/or dimensioned as an indicator (e.g., may be colored, such as red, to be readily visible through the housing 120).

As fluid pressure increases in the tube set 1000, as illustrated in FIG. 2, fluid flows into the passage 122 within the housing 120 and against the second side 131 of the movable element 130. The movable element 130 is thereby moved against the force of the biasing element 140 and moves from the first end 121 of the housing 120 towards the second end 123 of the housing 120. The position of a visually distinct portion of the movable element 130 along the graduated markings 126 may be viewed to determine the pressure building within the tube set 1000 and pressure gauge 100.

It will be appreciated that the pressure gauge and/or pressure relief valve 200 of the example of an embodiment illustrated in FIG. 3 may have a similar movable element as illustrated in the example of an embodiment illustrated in FIGS. 1 and 2. In both embodiments, a pressure gauge 100, 200 may be formed of a single-use and/or disposable and/or sterilizable material usable with a single-use and/or disposable and/or sterilizable fluid-containing structure. Moreover, in both embodiments, a pressure gauge 100, 200 may be readily retrofitted into a fluid-containing structure.

Additionally or alternatively, as noted above, the movable element 130 may be structured as a movable pressure valve. In the example of an embodiment illustrated in FIGS. 1 and 2, the pressure gauge and/or pressure relief valve 100 may be a pressure relief valve. As may be appreciated with reference to the cross-sectional view illustrated in FIG. 1, the housing 120 of the illustrated pressure relief valve 100 may be drafted (e.g., to facilitate molding thereof) such that the passage 122 therein is outwardly tapered from a first end 121 of the housing 120 to a second end 123 of the housing 120. The movable element 130 moves from the first end 121 of the housing 120 (as illustrated in FIG. 1) towards a second end 123 of the housing 120 to a pressure relief position as illustrated in FIG. 2. Before reaching a pressure relief position, the periphery of the movable element 130 contacts the inner surface 125 of the housing 120, preventing fluid from flowing past the movable element 130 (between the periphery of the movable element 130 and the inner surface 125 of the housing 120). In a pressure relief position, such as illustrated in FIG. 2, the periphery of the movable element 130 is spaced from the inner surface 125 of the housing 120, and fluid may pass around/bypass the movable element 130 to exit or be released from the tube set 1000 if fluid pressure in the fluid-containing structure exceeds a pressure-relief value. In some embodiments, the fluid may be relieved through a pressure relief tube 150 to a collection bag, drain, waste, etc. Any of a variety of connectors, such as the illustrated hose barb connector 152, may couple the housing 120 with the pressure relief tube 150. In some embodiment, such as illustrated in FIGS. 1 and 2, the hose barb connector 152 may be formed as a part of the valve cover 124. However, other configurations/connections are within the scope and spirit of the present disclosure.

The pressure relief value may be calculated based on a burst strength of the tubing 1002 or other failure point of any of a variety of components of the tube set 1000 or devices or systems or apparatuses with which the tube set 1000 is coupled. One or more of the biasing element 140, the outer dimensions of the movable element 130, or the inner dimensions of the housing passage 122 may be selected such that fluid passes the movable element 130 and out an opening along the second end 123 of the housing 120 at the appropriate pressure level of fluid within the tube set 1000 and/or pressure relief valve 100

In some embodiments, the movable element 130 is formed as a multi-part component. For instance, as described above, the movable element 130 may include a first section 132 and a second section 134. In some embodiments, one of the first or second sections 132, 134 is formed of a flexible material. The outer dimension of such flexible section may be greater than the inner dimension of the housing passage 122 when the movable element 130 is closer to the first end 121 of the housing 120 so that the flexible section may be folded or otherwise deformed to seal against the inner surface 125 of the housing 120 to prevent fluid from leaking or otherwise passing out of the tube set 1000. As the movable element 130 moves from the first end 121 of the housing 120 towards the second end 123 of the housing 120, the flexible section may expand. However, once the movable element 130 reaches a pressure relief position, even in the expanded configuration, outer periphery of the flexible section and other portions of the movable element 130 are spaced apart from the inner surface 125 of the housing 120 so that fluid may pass therebetween, such as to exit the housing 200 and/or to relieve pressure in the system (the tube set 1000 and/or the pressure relief valve 100). Fluid may exit via the second end 121 of the housing 120.

As noted above, it will be appreciated that the pressure gauge and/or pressure relief valve 200 of the example of an embodiment illustrated in FIG. 3 may have a similar movable element, structured as a relief valve, as illustrated in the example of an embodiment illustrated in FIGS. 1 and 2. In both embodiments, a pressure relief valve 100, 200 may be formed of a single-use and/or disposable and/or sterilizable material usable with a single-use and/or disposable and/or sterilizable fluid-containing structure. Moreover, in both embodiments, a pressure relief valve 100, 200 may be readily retrofitted into a fluid-containing structure.

In accordance with various principles of the present disclosure, a sensor may be provided to determine further information or characteristics of the fluid within the fluid-containing structure with which the pressure gauge and/or pressure relief valve 100. Any sensor known or heretofore known in the art may be used, the present disclosure not being limited by the details of features or structure of the sensor. A schematic illustration of a sensor 160 is illustrated in FIG. 1 and FIG. 2 as coupled to the housing 120 of the pressure gauge and/or pressure relief valve 100. The sensor 160 may be configured and arranged to monitor the position of the movable element 130 (e.g., optical sensing, such as with UV light, at a particular position, or chasing/following the position of the movable element 130), and/or coupled (e.g., electrically or mechanically) to a component of the pressure gauge and/or pressure relief valve 100 (such as the biasing element 140) to sense characteristics or properties of fluid within the fluid-containing structure to which the pressure gauge and/or pressure relief valve 100 is coupled. Information from the sensor 160 may be displayed on a display of the sensor 160 and/or recorded by the sensor 160. Additionally or alternatively, information from the sensor 160 may be transmitted to another device and displayed on a display of such device, and/or recorded, and/or further processed by such device. Such device, in turn, may, upon processing information from the sensor 160, control one or more devices associated with the fluid-containing structure and/or the pressure gauge and/or pressure relief valve 100. For instance, based on the information sensed by the sensor 160, one or more pumps may be controlled (turned on or off, speed adjusted, etc.), flow paths may be adjusted (opened, closed, rate of flow therethrough otherwise modified, etc.), filtration devices adjusted (turned on or off, speed adjusted, etc.), and/or other devices and/or processes affected, the present disclosure not being limited in this regard.

The foregoing discussion has broad application and has been presented for purposes of illustration and description and is not intended to limit the disclosure to the form or forms disclosed herein. It will be understood that various additions, modifications, and substitutions may be made to embodiments disclosed herein without departing from the concept, spirit, and scope of the present disclosure. In particular, it will be clear to those skilled in the art that principles of the present disclosure may be embodied in other forms, structures, arrangements, proportions, and with other elements, materials, and components, without departing from the concept, spirit, or scope, or characteristics thereof. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. While the disclosure is presented in terms of embodiments, it should be appreciated that the various separate features of the present subject matter need not all be present in order to achieve at least some of the desired characteristics and/or benefits of the present subject matter or such individual features. One skilled in the art will appreciate that the disclosure may be used with many modifications or modifications of structure, arrangement, proportions, materials, components, and otherwise, used in the practice of the disclosure, which are particularly adapted to specific environments and operative requirements without departing from the principles or spirit or scope of the present disclosure. For example, elements shown as integrally formed may be constructed of multiple parts or elements shown as multiple parts may be integrally formed, the operation of elements may be reversed or otherwise varied, the size or dimensions of the elements may be varied. Similarly, while operations or actions or procedures are described in a particular order, this should not be understood as requiring such particular order, or that all operations or actions or procedures are to be performed, to achieve desirable results. Additionally, other implementations are within the scope of the following claims. In some cases, the actions recited in the claims can be performed in a different order and still achieve desirable results. The presently disclosed embodiments are therefore to be considered in all respects as illustrative and not restrictive, the scope of the claimed subject matter being indicated by the appended claims, and not limited to the foregoing description or particular embodiments or arrangements described or illustrated herein. In view of the foregoing, individual features of any embodiment may be used and can be claimed separately or in combination with features of that embodiment or any other embodiment, the scope of the subject matter being indicated by the appended claims, and not limited to the foregoing description.

In the foregoing description and the following claims, the following will be appreciated. The phrases "at least one", "one or more", and "and/or", as used herein, are open-ended expressions that are both conjunctive and disjunctive in operation. The terms "a", "an", "the", "first", "second", etc., do not preclude a plurality. For example, the term "a" or "an" entity, as used herein, refers to one or more of that entity. As such, the terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, counterclockwise, and/or the like) are only used for identification purposes to aid the reader's understanding of the present disclosure, and/or serve to distinguish regions of the associated elements from one another, and do not limit the associated element, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

The following claims are hereby incorporated into this Detailed Description by this reference, with each claim standing on its own as a separate embodiment of the present disclosure. In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. Reference signs in the claims are provided merely as a clarifying example and shall not be construed as limiting the scope of the claims in any way.

What is claimed is:

1. A pressure gauge with integrated relief valve configured to measure and to relieve fluid within a fluid-containing structure, said integrated pressure gauge relief valve comprising:
    a housing having a first end and a second end and having an inner surface defining a passage between said first end and said second end;
    a movable element movable within said passage;
    wherein:
        said housing first end is configured to be coupled with a fluid-containing structure;
        said housing second end is spaced from said housing first end; and
        said movable element is movable with respect to said housing to indicate pressure therein and to allow fluid to pass between the movable element and said inner surface of said passage at a selected pressure; and
        said movable element has a first side facing toward the fluid-containing structure and aligned with an inner surface of a wall of the fluid-containing structure to which said integrated pressure gauge relief valve is coupled thereby eliminating creation of a dead region between the passage and the fluid-containing structure to minimize collection of fluid flow.

2. The integrated pressure gauge relief valve of claim 1, further comprising graduated markings on said housing, said movable element movable with respect to said graduated markings to indicate pressure within said housing.

3. The integrated pressure gauge relief valve of claim 2, wherein said housing is formed of transparent or translucent material so that said movable element is viewable therein adjacent said graduated markings.

4. The integrated pressure gauge relief valve of claim 1, wherein said passage within said housing is tapered outwardly from said first end of said housing to said second end of said housing.

5. The integrated pressure gauge relief valve of claim 4, wherein:
    said movable element seals against said inner surface of said housing when said movable element is positioned adjacent said first end of said housing;
    said housing defines a fluid exit adjacent said second end of said housing; and
    said movable element has a periphery spaced from said inner surface of said housing when said movable element is positioned adjacent said fluid exit to allow fluid to exit said housing through said fluid exit.

6. The integrated pressure gauge relief valve of claim 5, further comprising a biasing element configured and positioned to bias said movable element toward said first end of said housing.

7. The integrated pressure gauge relief valve of claim 1, wherein said housing is formed of a sterilizable polymeric material.

8. The integrated pressure gauge relief valve of claim 1, wherein said housing is formed of a material weldable with a sterilizable fluid-containing structure.

9. The integrated pressure gauge relief valve of claim 8, wherein said housing is formed of a sterilizable polymeric material weldable with a sterilizable fluid-containing structure.

10. The integrated pressure gauge relief valve of claim 1, further comprising a sensor coupled to said housing.

11. A sterilizable single-use pressure gauge and/or relief valve comprising:
a housing comprised of a sterilizable polymeric material, and having a first end and a second end and an inner surface defining a passage between said first end and said second end; and
a movable element movable within said passage in response to a change in pressure within said housing, said movable element including a first side facing toward a fluid-containing structure and aligned with an inner surface of a wall of the fluid-containing structure to which said pressure gauge and/or relief valve is coupled thereby eliminating creation of a dead region between the passage and the fluid-containing structure to minimize collection of fluid flow.

12. The pressure gauge and/or relief valve of claim 11, further comprising graduated markings on said housing, said movable element movable with respect to said graduated markings to indicate pressure within said housing indicative of pressure within a fluid-containing structure to which said housing is coupled.

13. The pressure gauge and/or relief valve of claim 12, wherein said housing is formed of transparent or translucent material so that said movable element is viewable therein adjacent said graduated markings.

14. The pressure gauge and/or relief valve of claim 12, wherein said passage within said housing is tapered outwardly from said first end of said housing to said second end of said housing so that said movable element prevents fluid from flowing between the outer periphery of said movable element and said inner surface of said housing when said movable element is adjacent said housing first end, and allows fluid to flow between the outer periphery of said movable element and said inner surface of said housing when said movable element is adjacent said second end of said housing to relieve pressure from within the fluid-containing structure to which said pressure gauge and/or relief valve is coupled.

15. The pressure gauge and/or relief valve of claim 11, wherein said passage within said housing is tapered outwardly from said first end of said housing to said second end of said housing so that said movable element prevents fluid from flowing between the outer periphery of said movable element and said inner surface of said housing when said movable element is adjacent said first end of said housing, and allows fluid to flow between the outer periphery of said movable element and said inner surface of said housing when said movable element is adjacent said second end of said housing to relieve pressure from within the fluid-containing structure to which said pressure gauge and/or relief valve is coupled.

16. The pressure gauge and/or relief valve of claim 11, wherein said sterilizable polymeric material is weldable to sterilizable material forming a fluid-containing structure to which said pressure gauge and/or relief valve is coupled.

* * * * *